United States Patent
Li

(10) Patent No.: US 7,444,422 B1
(45) Date of Patent: Oct. 28, 2008

(54) MULTICAST WHEN FORWARDING INFORMATION IS UNKNOWN

(75) Inventor: Yunzhou Li, Lowell, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 534 days.

(21) Appl. No.: 09/685,905

(22) Filed: Oct. 10, 2000

(51) Int. Cl.
    *G06F 15/173* (2006.01)
    *H04L 12/28* (2006.01)
    *H04L 12/56* (2006.01)
    *G06F 15/16* (2006.01)

(52) U.S. Cl. ................................ 709/238; 370/390

(58) Field of Classification Search ......... 709/210–253; 370/256, 390, 254, 255, 258, 259, 399–408, 370/432, 355, 395, 466, 347, 200.66, 398, 370/351, 244, 338

See application file for complete search history.

(56) References Cited

U.S. PATENT DOCUMENTS

| | | | |
|---|---|---|---|
| 5,903,559 A * | 5/1999 | Acharya et al. | 370/355 |
| 5,991,292 A * | 11/1999 | Focsaneanu et al. | 370/352 |
| 6,104,870 A * | 8/2000 | Frick et al. | 703/27 |
| 6,260,073 B1 * | 7/2001 | Walker et al. | 709/249 |
| 6,611,872 B1 * | 8/2003 | McCanne | 709/238 |
| 6,795,403 B1 * | 9/2004 | Gundavelli | 370/256 |
| 7,016,351 B1 * | 3/2006 | Farinacci et al. | 370/392 |
| 2003/0165140 A1 * | 9/2003 | Tang et al. | 370/393 |

* cited by examiner

*Primary Examiner*—George C Neurauter, Jr.
(74) *Attorney, Agent, or Firm*—Anderson Gorecki & Manaras LLP

(57) ABSTRACT

Multicasting data includes multicasting data to at least one line card attached to a router and storing state information associated with the data as a default state at each line card the data was multicast to. Multicast data having an unknown source and/or an unknown group need not be forwarded to the control path; the data path can be relied upon. A multicast packet included in the data can be forwarded up and evaluated to determine the packet's multicast source and/or group. After the state(s) are determined, the forwarding decision for the known states can be changed to "no more forwarding" for line cards that need not receive data destined for the multicast group, e.g., ports not leading to member of the multicast group.

36 Claims, 7 Drawing Sheets

MULTICAST WHEN FORWARDING INFORMATION IS UNKNOWN

BACKGROUND

This invention relates to multicasting data.

Multicasting allows a data source to transmit a packet or a stream of data across a network such as the Internet to a multicast group regardless of the number of recipients included in the multicast group. Routers capable of handling multicast traffic can replicate and forward the packet or stream as necessary to accommodate any number of recipients in the multicast group.

Clients, e.g., mobile or stationary computers, personal digital assistants, telephones, pagers, and other devices capable of communicating with the network, and the routers can use an Internet Gateway Management Protocol (IGMP) to dynamically create the multicast group. The routers deliver multicast data to members of the dynamically produced multicast group using a multicast routing protocol such as distance vector multicast routing protocol (DVMRP), multicast extensions to open shortest path first (MOSPF), and/or protocol independent multicast (PIM).

The multicast routing protocol establishes a distribution tree for the multicast data where the data is transmitted along "branches" of the tree through the network to the tree "leaves," the members of the multicast group. As clients join the multicast group, the tree can "grow" more branches to reach the new members. Similarly, as clients leave the multicast group, branches can be "pruned" from the tree to prevent the multicast data from unnecessarily traveling through the network.

SUMMARY

According to one aspect of the present invention, a method includes multicasting data to at least one line card configured to attach to a router and storing state information associated with the data as a default state at each line card the data was multicast to.

According to another aspect of the present invention, an router includes a line card configured to store state information for multicast data as a default state, and a central controller unit configured to attach to the line card and configured to receive a packet included in the multicast data and to determine from the packet where to route the multicast data.

According to another aspect of the present invention, a method includes receiving multicast data including unknown state information and storing the multicast data with default state information. The method performs a reverse path forwarding check on the multicast data and verifies that the multicast data was received at a proper interface. The method also determines a multicast group associated with the multicast data and routes the multicast data to the multicast group.

According to another aspect of the present invention, a method includes installing a default state associated with multicast data in a data path of a line card and broadcasting the multicast data from the line card to all other line cards that the line card is configured to communicate with. The multicast data is sent from the data path to a control path of the line card. At the control path, a route is computed for the multicast data and the computed route is sent from the control path to the data path. The line cards not included in the computed route are designated as not to be broadcast multicast data received at the data path subsequent to the multicast data and having the same state information as the multicast data.

One or more of the following advantages may be provided by one or more aspects of the invention.

Currently, routing protocols such as DVMRP, MOSPF, and PIM-DM (PIM dense mode) do not define default source-group states, e.g., (*,*) and (*,G). When a router receives a multicast packet or packets from an unknown source and/or to an unknown multicast group, the router sends the multicast data to the control path of the router's processing unit, e.g., a central controller or processor. The processing unit evaluates the data to determine where to route the packet(s) and sends the determined state(s) for storage. This evaluation and storage is a potentially time-consuming and resource-consuming process. Further, the packet(s) may end up being dropped by the router and therefore not be forwarded to any of the router's ports (excluding the port the packet(s) arrived at).

By allowing the router to assign a default state to an unknown source and/or an unknown group of incoming multicast data, the router can minimize multicast data loss and buffer resource utilization in the control path. Multicast data having an unknown source and/or an unknown group is not always sent to the control path; the data path can be relied upon. The control path only accepts the first copy of the multicast data having the unknown source and/or the unknown group and drops any subsequent copies. When the router receives a multicast packet or packets from an unknown source and/or to an unknown multicast group, the router can assign a default or wild card state to the unknown(s) and forward the multicast data to the router's ports (excluding the port the packet(s) arrived on). A multicast packet included in the incoming data can then be forwarded up to the control path and evaluated to determine the packet's multicast source and/or group. After the state(s) are determined, the forwarding decision for the known states can be changed to "no more forwarding" for ports that need not receive data destined for the multicast group, e.g., ports not leading to members of the multicast group.

Other advantages and features will become apparent from the following description and from the claims.

DETAILED DESCRIPTION

Figure 1:
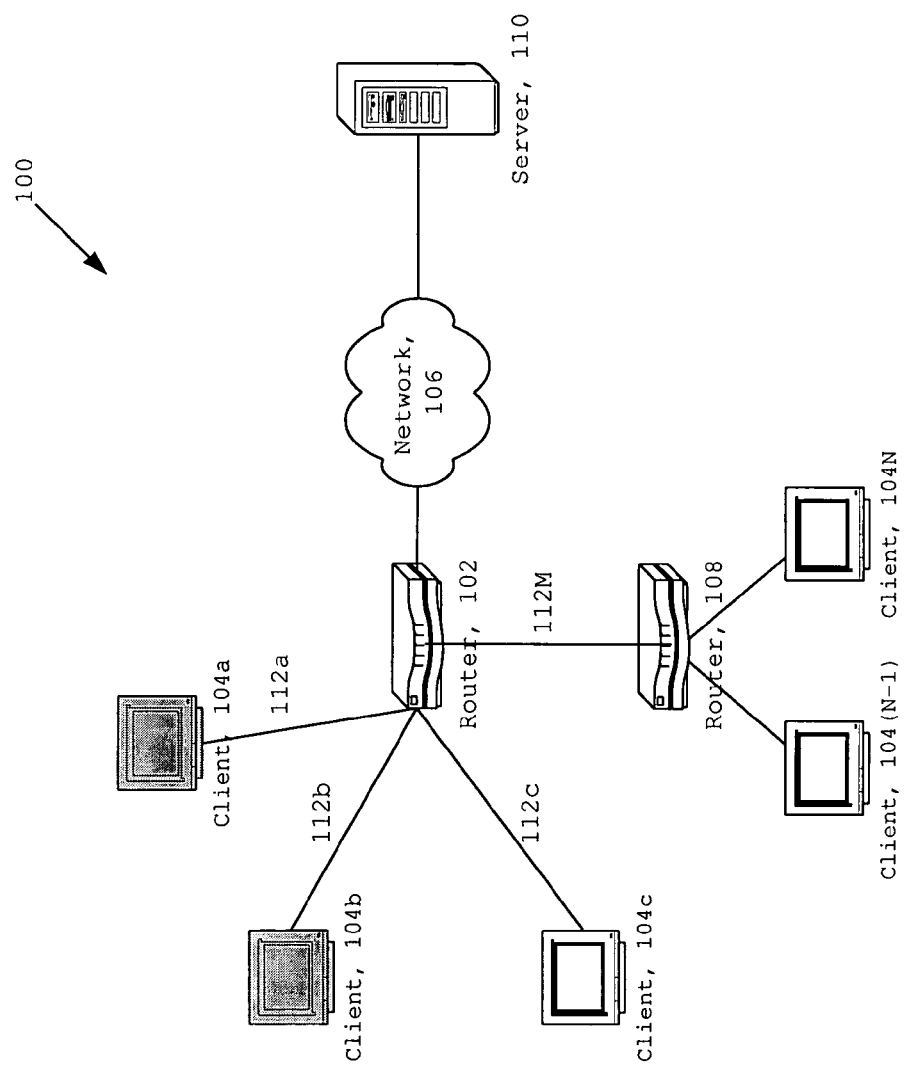
FIG. 1 is a block diagram of a network configuration.

Referring to FIG. 1, a network configuration 100 includes a router 102, e.g., a big fast router (BFR), i.e., switching router or switch router, that can route packets between a network 106 such as the Internet and network elements such as clients 104a-N. Clients 104a-c are directly accessible from the router 102, whereas clients 104(N-1), 104N are accessible to the router 102 via another router 108. The shaded clients 104a-b are members of a multicast group that can receive multicast packets from a server 110. When the server 110 sends a multicast packet (hereinafter "the packet") to the network 106 and the packet reaches the router 102, the router 102 determines whether and where to forward the packet. The router 102 includes routing lookup capabilities enabling the router 102 to examine multicast packets, look up the packet's routing information in the router's routing table(s), and appropriately route or drop the packet using one or more routing protocols. If the router 102 determines that the packet should be forwarded to one or more destinations "behind" the router 102, the router 102 sends the packet (or a copy of the packet) to the appropriate link or links 112a-M (wires, cables, etc.).

The router 102 can minimize data loss and buffer resource utilization in the control path by installing default states. In packet forwarding, the router 102 uses a data path and a control path. The data path's functions include making a forwarding decision, sending the packet over a fabric included in the router 102 to the appropriate port included in the router 102, and maintaining the packet in line behind more urgent packets, e.g., buffering packets and ensuring quality of service (QoS). The control path's functions include implementing the routing protocols used by the router 102. The control path includes elements to implement policies, algorithms, mechanisms, and signaling protocols to manage internal data and control circuits, extract routing and protocol information from the packet and convey that information to control the data path, collect data path information such as traffic statistics, and handle some control messages.

The default states indicate routing information for multicast data. The routing information includes a source-group pair, generally expressed as (source, group) or as (S,G). The source parameter indicates the source transmitting the multicast data. The group parameter indicates members of the multicast group to receive the multicast data. A default source-group pair can be expressed as (*,*). The asterisks are wild cards and represent states not known to the router 102.

Figure 2:
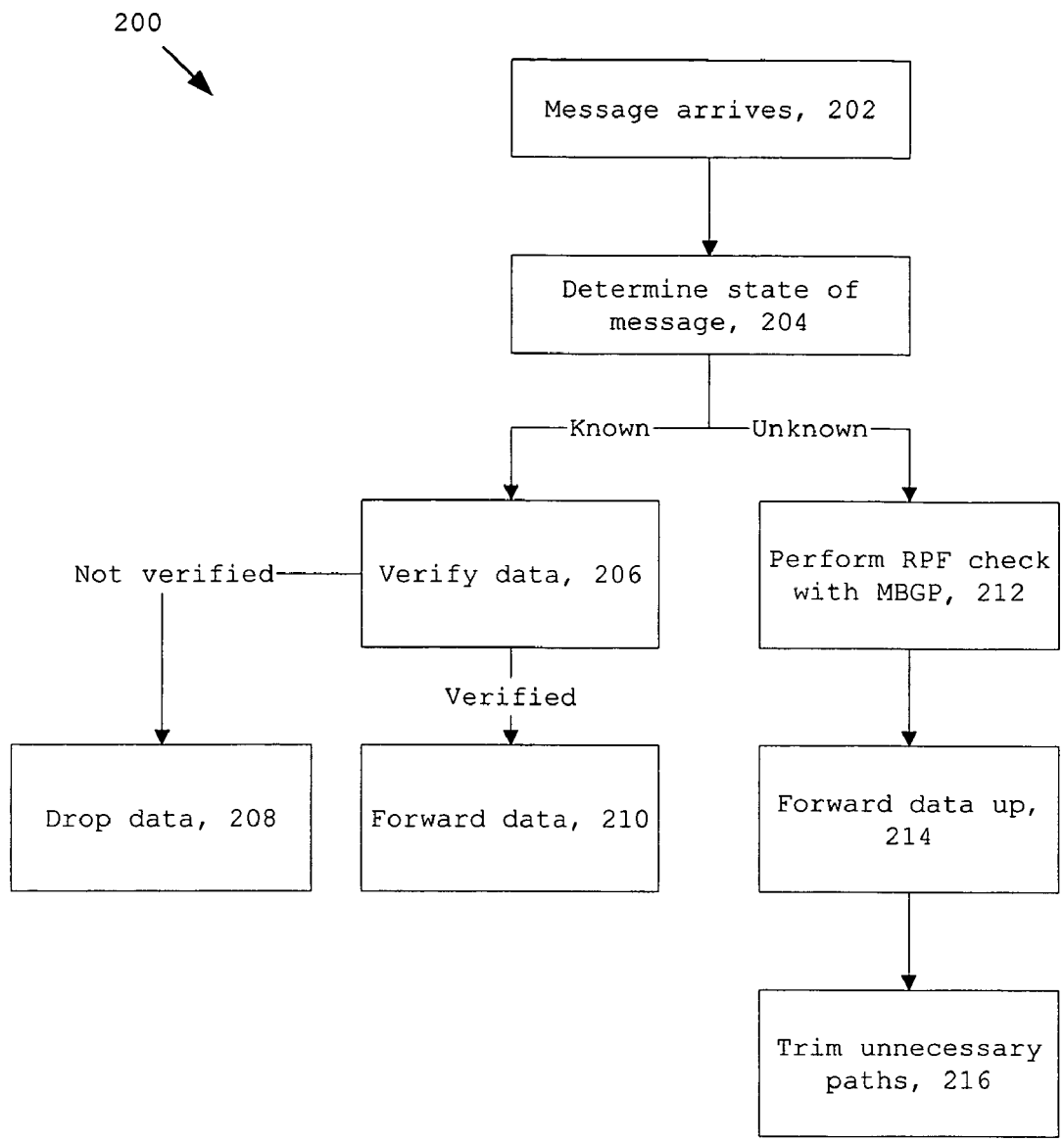
FIG. 2 is a flowchart showing a process of multicasting data.

Referring to FIG. 2, a process 200 to route multicast data is shown. Each group of multicast data received 202 by the router 102 can include one or more multicast packets from the same source and to the same multicast group. The router 102 determines 204 the state of the data. If the router 102 recognizes the state of the data from the state information itself, i.e., the state is known, then the router 102 verifies 206 that the data came in to the router 102 at the correct interface. The state information includes incoming and outgoing interfaces for the data, and the router 102 simply verifies that the data was received at the proper incoming interface. If the route is not verified, then the data did not arrived from the proper interface and the router 102 drops 208 the data without forwarding it to other ports (the ports other than the port the data arrived at). If verified, the router 102 multicasts 210 the data as is known to the router per the router's usual routing techniques, e.g., routing tables.

If the router 102 does not recognize the state of the data, the router uses a default state for the data. At the data path, the router 102 performs 212 a reverse path forwarding (RPF) check with MBGP (or other protocol as discussed above). This performance verifies that the data came in to the router 102 at the correct interface. The performance also broadcasts the data to all of the router's interfaces (ports or slots) except the interface that the data came from (the slot leading back to the source) per any RPF technique. In this way, the data is put in the queue for transmission at each of these interfaces because the router does not know the routing information for the data. A packet included in the data is forwarded up 214 and evaluated to determine the multicast group of the data. Paths are trimmed 216 to interfaces that do not need to receive data addressed to this multicast group.

Figure 3:
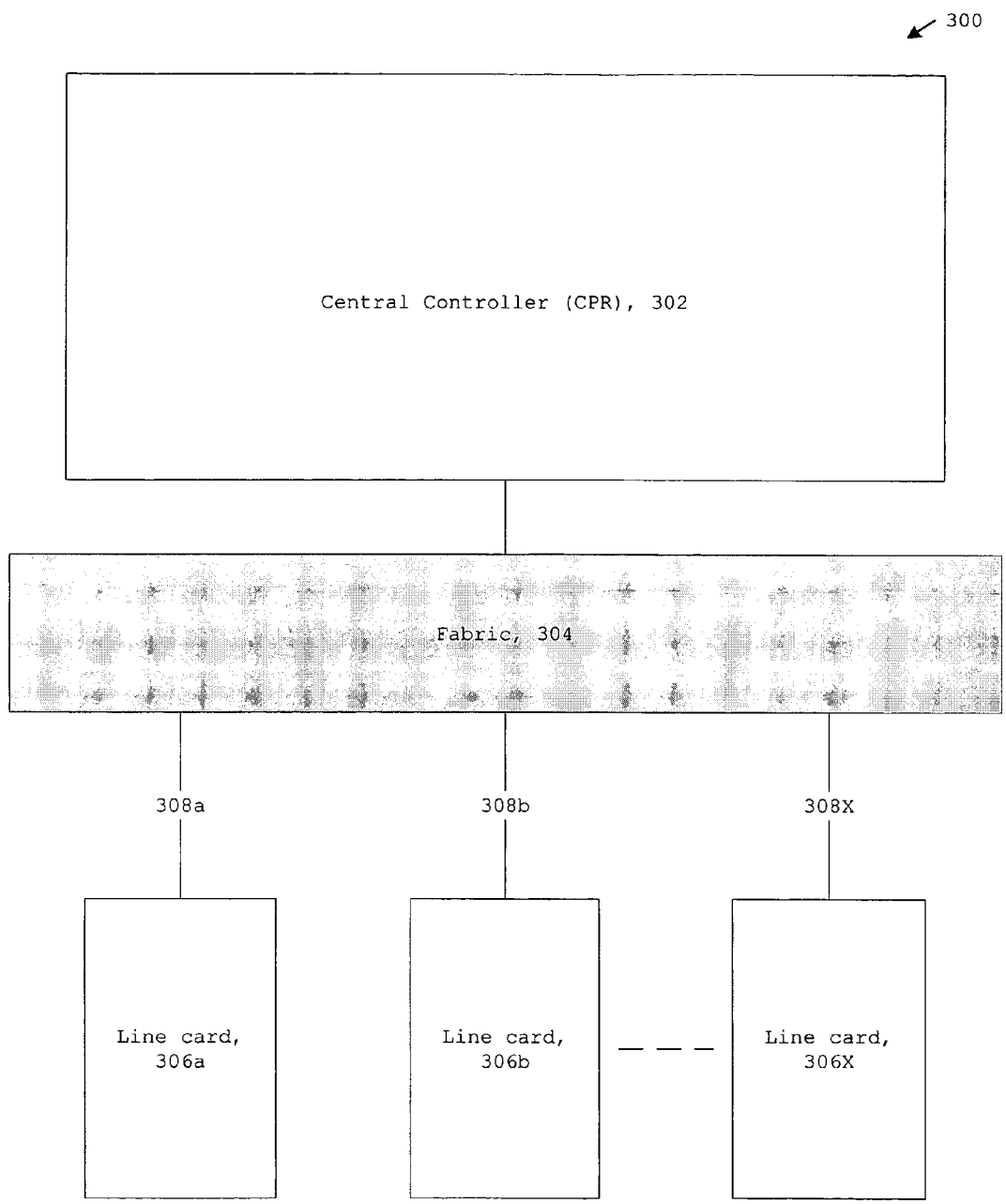
FIG. 3 is block diagram of a switch.

Referring to FIG. 3, an implementation 300 of the router 102 includes a central controller (CPR) 302, a fabric 304, and line cards 306a-X. The CPR 302 acts as the data path. The fabric 304 includes architecture used by the router 102 to redirect data entering the router 102 at one line card 306 to one or more other line cards 306a-X.

The line cards 306a-X are the router's interfaces or ports. The router 102 can include any number (X) of line cards that plug into or otherwise connect with the router 102. As shown in FIG. 1, the router 102 has at least (M+1) line cards, one line card for each link 112a-M and one line card for the link to the network 106. The number of line cards may be limited by the number of plug-ins that the router 102 can support. Each line card 306a-X is connected to the fabric 304 through a direct point-to-point connection link 308.

Figure 4:
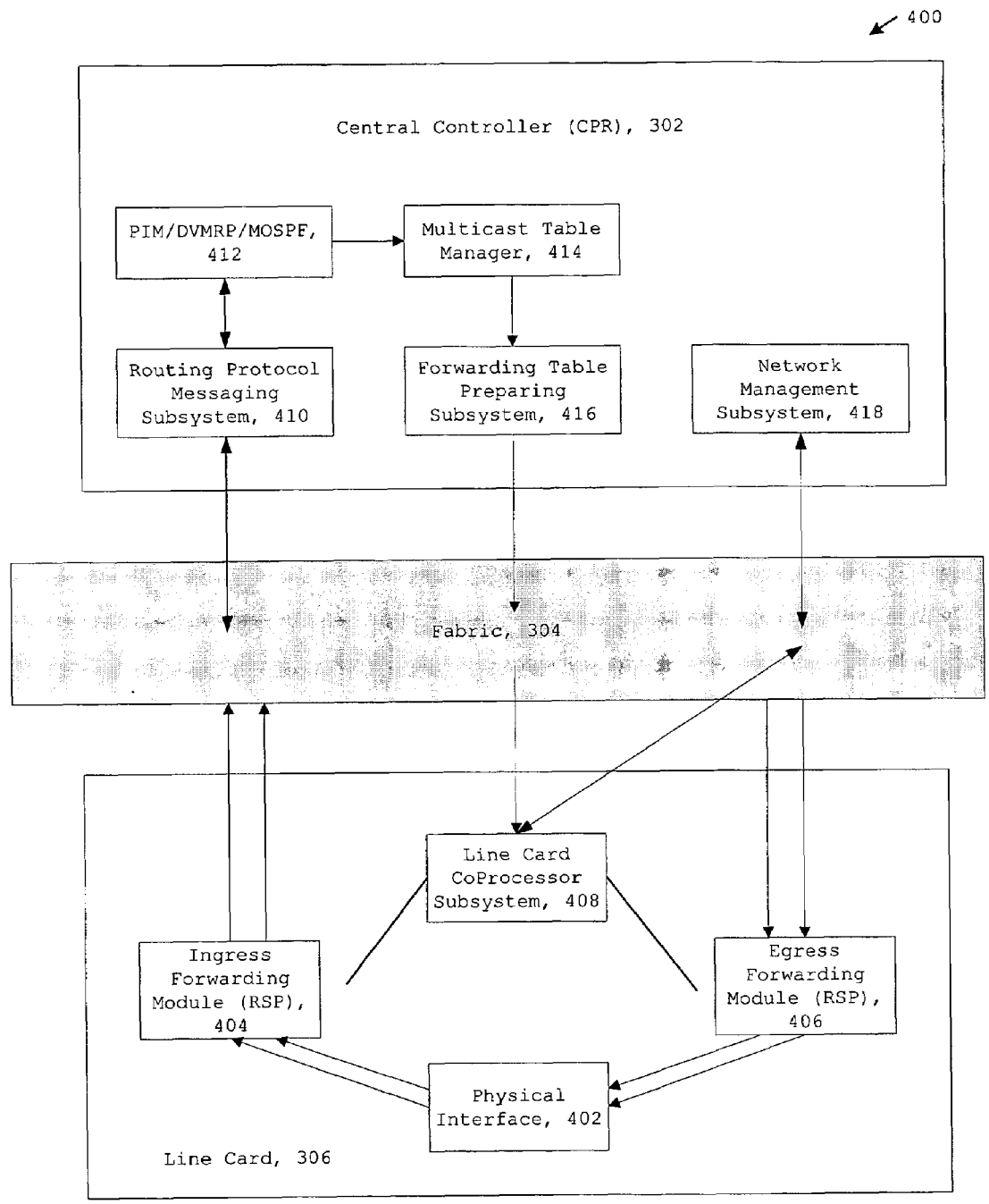
FIG. 4 is an expanded block diagram of the switch in FIG. 3.

Referring to FIG. 4, an implementation 400 shows the implementation 300 of FIG. 3 in more detail. (Only one line card 306 is shown for simplicity.) Data can be multicast through the implementation 400 as described below.

Multicast data (assumed here for simplicity to be one packet) arrives at the router 102 through the line card 306 at a physical interface 402. The data passes through the physical interface 402 to an ingress forwarding module 404, a route switch processor (RSP). An RSP has routing lookup functions implemented with software and/or a processor and/or application specific integrated circuits (ASICs) that enable the RSP to inspect incoming packets and support routing protocols. A coprocessor system 408 manages the processing functions of the line card 306; the coprocessor system 408 is not responsible for data forwarding. Functions of the ingress forwarding module 404 include examining the packet's header information to determine which other line cards 306, if any, to route the packet to and looking up the address of those line cards 306. The ingress forwarding module 404 also includes one or more multicast routing tables that allow the ingress forwarding module 404 to perform a RPF check on the data and verify that the data came from the correct interface. The data is multicast from the line card 306 to the other line cards 306 (see FIG. 3) through the fabric 304. An egress forwarding module 406 in each line card receives the data and controls the movement of the data from its associated line card 306. The routing information for the data is stored as a wild card at each of the line cards 306a-X, e.g., as a (*,*) source-group pair. The ingress forwarding module 404 forwards up one of the packets included in the data, which may include one or more data packets, to the CPR 302 (at a routing protocol messaging subsystem 410) through the fabric 304.

The CPR 302 acts as the data path and evaluates the packet to determine the packet's multicast group. This evaluation also determines the multicast group of the data as all packets included in the data are assumed to be routed from the same source to the same group, i.e., have the same source-group pair. A multicast routing protocol 412, e.g., PIM-DM, DVMRP, and MOSPF, examines the protocol's appropriate routing table(s) to determine where to route the packet. The multicast routing protocol 412 sends the parts of the routing table that indicated how to route the packet to a multicast table manager 414. The multicast table manager 414 copies (mirrors) these parts of the routing table in the control path, so the forwarding state for the packet is saved at the multicast table manager 414. The multicast table manager 414 sends the routing information to a forwarding table preparing system 416, which is an interface from the control path to the data path, e.g., an application program interface (API). From the forwarding table preparing system 416, the forwarding state (routing information) for the packet travels through the fabric 304 to the line cards 306. The line cards 306 take the data from the forwarding table preparing system 416 and install the appropriate routes to memory using the coprocessor system 408. Paths to line cards not including members of the multicast group are trimmed at the line cards using a network management subsystem 418.

Figure 5:
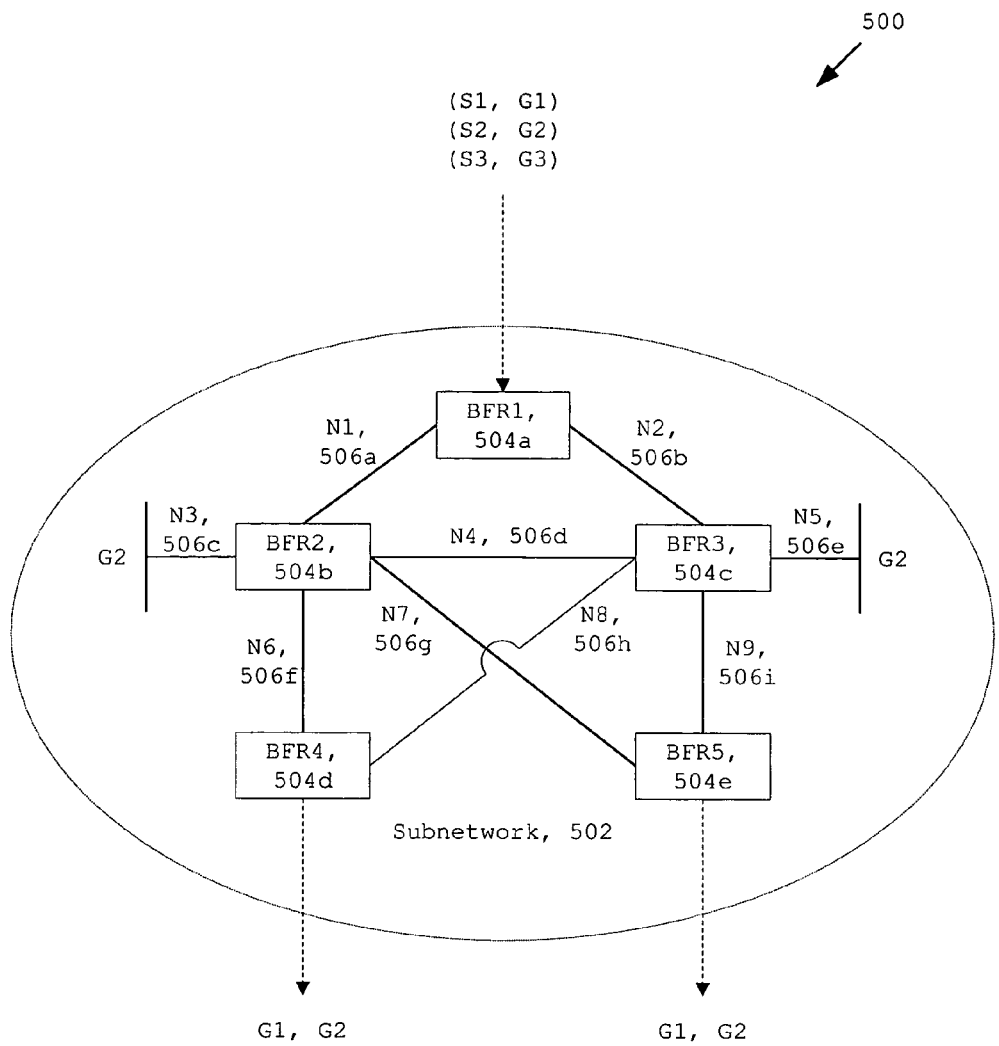
FIG. 5 is a block diagram of a short path tree.

Referring to FIG. 5, a short path tree 500 illustrates a partial network configuration 502 (subnetwork 502). The subnetwork 502 includes five big fast routers (BFRs): BFR1 504a, BFR2 504b, BFR3 504c, BFR4 504d, and BFR5 504e. The BFRs 504a-e are connected via links N1-9 506a-i. Examples of multicast data that can be sent to the subnetwork 502 include data having source-group pairs of (S1,G1), (S2,G2), and (S3,G3). Note that members of G2 (group two) can be contacted through link N5 506e via BFR3 504c and through link N3 506c via BFR2 504b. Also note that members of G1 (group one) and G2 can be contacted via BFR4 504d and BFR5 504e. Members of G3 (group three) are not noted in the short path tree 500, indicating that the BFRs 504a-e in the subnetwork 502 do not recognize that group and would use wild cards in routing data to G3.

Figure 6:
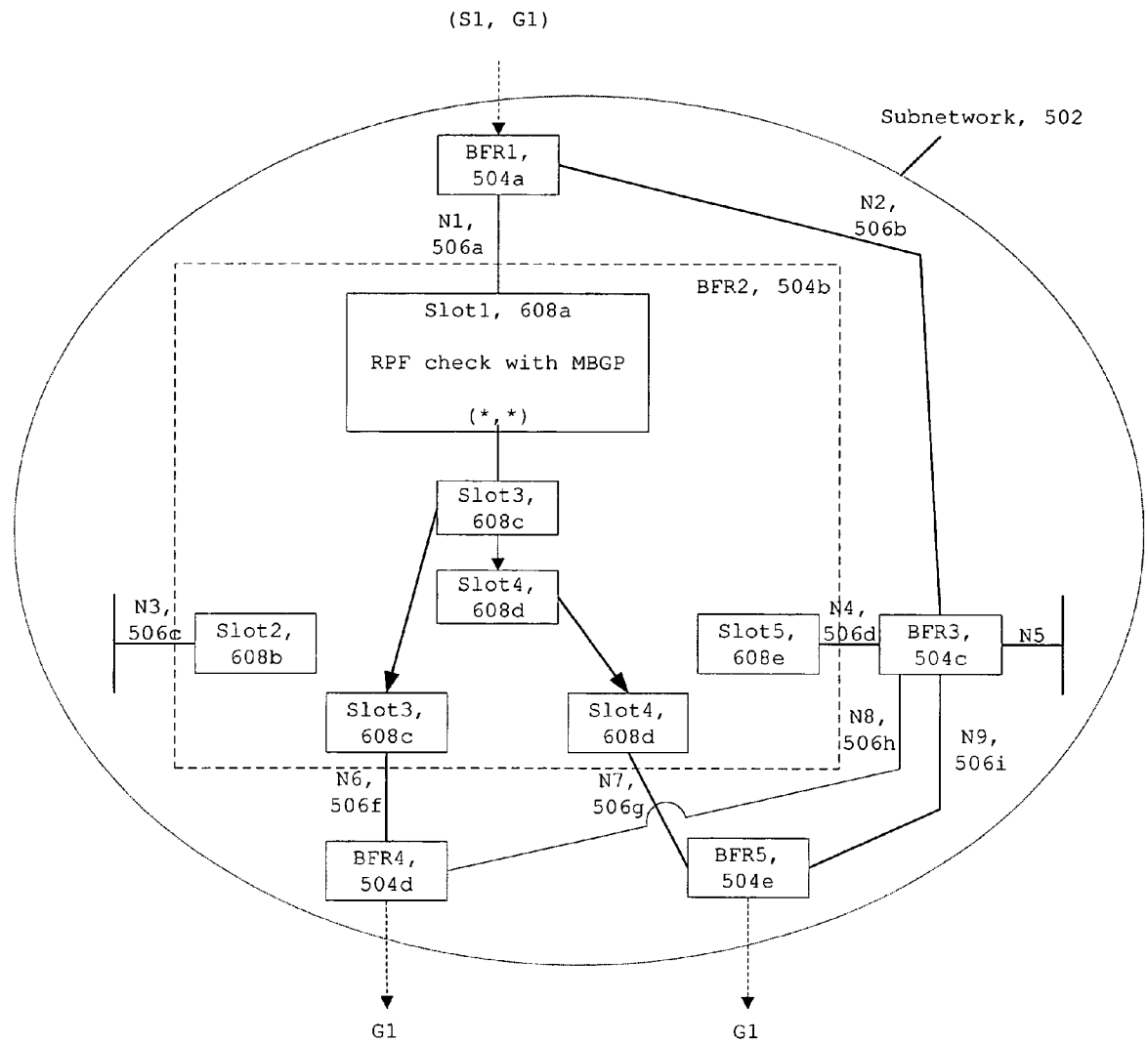
FIGS. 6-7 are expanded block diagrams of the short path tree of FIG. 5.

Referring to FIG. 6, multicast data (S1,G1) is sent to the subnetwork 502 at the BFR1 504a. The data should be multicast through the subnetwork 502 towards the members of G1 "behind" the BFR4 504d and the BFR5 504e. The BFR1 504a multicasts the data on its two links N1 506a and N2 506b to, respectively, the BRF2 504b and the BFR3 504c. Multicast routing in accordance with the description above is described below with reference to the BFR2 504b.

An internal view of the BFR2 504b is shown that includes slots 608a-e. The slots 608a-e are the interfaces (ports or line cards) that connect the BFR2 504b with the links N1 506a, N3 506c, N4 506d, N6 506f, and N7 506g. The BFR2 504b includes other elements, such as a fabric and a CPR, that are not shown for simplicity.

The data from the BFR1 504a is multicast over the link N1 506a and arrives at the slot1 608a in the BFR2 504b. The data is evaluated per the process described above (see FIGS. 2-4 and accompanying description). The BFR2 504b uses the most specific state that it receives from the BFR1 504a. States from least specific to most specific are:

a) (*,*)
 b) (*,[known group, e.g., G2])
 c) ([known source, e.g., S2],[known group]).

Because the BFR2 504b did not receive the (S1,G1) state information for the data from the BFR1 504a, the slot1 608a considers the data as having a default state (*,*). Similarly, if the BFR2 504b had received a (S3,G3) state for the data across the link N1 506a, the BFR2 would not recognize that state and would use a default (*,*) state for the data. Not knowing the state of the data, the BFR2 504a performs an RPF check with MBGP. Once verifying that the data arrived at the correct interface and determining that the data's (S1, G1) state at the CPR, the data can be multicast to the proper slots 608. The slot1 608a multicasts the data to the slot3 608c and the slot4 608d. The data is not multicast to the slot2 608b or the slot5 608e because there are no G1 members located beyond either of those slots 608b,e. The data is multicast through the BFR4 504d and the BFR5 504e.

Figure 7:
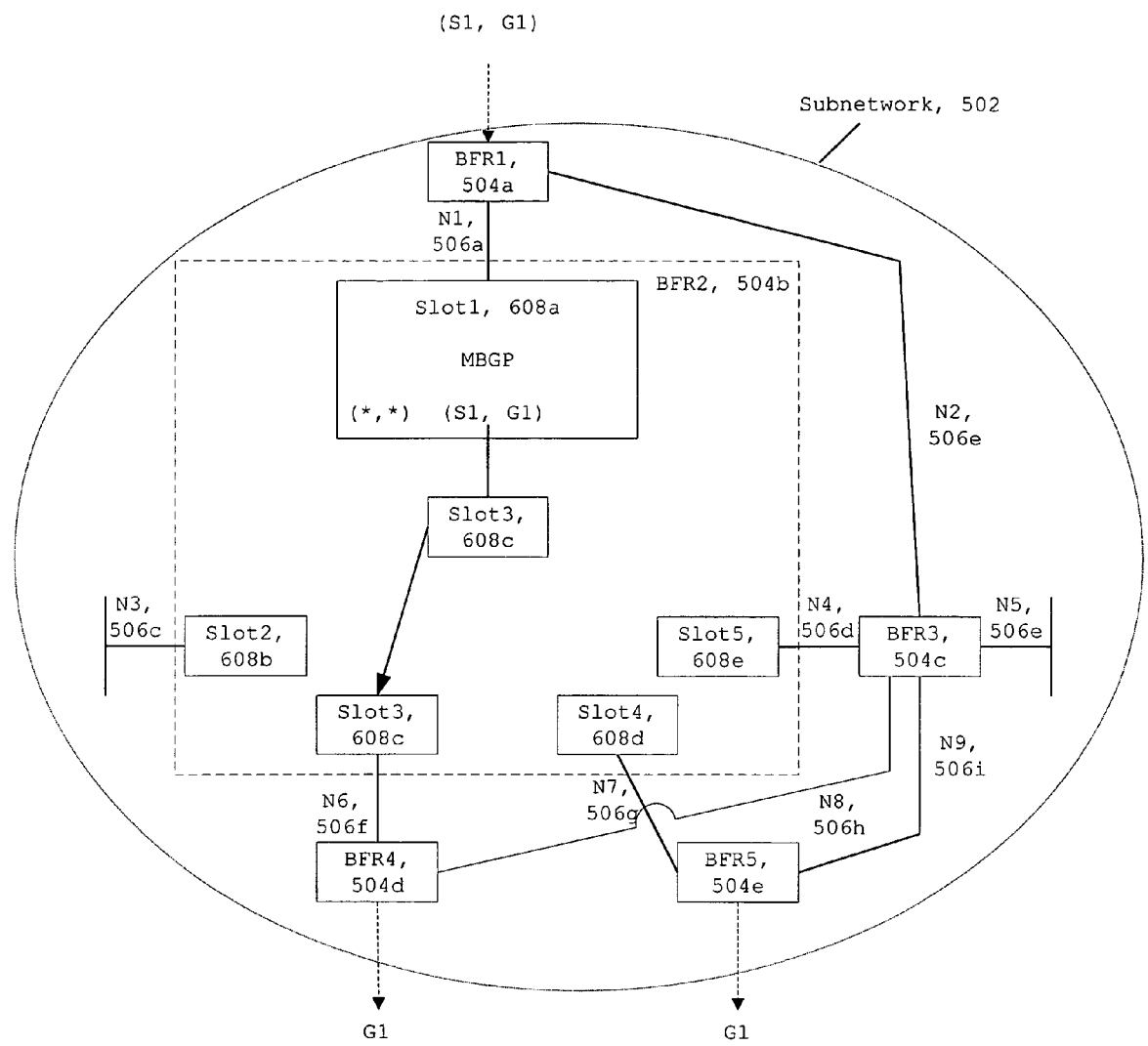

Referring to FIG. 7, another example of multicasting data through the subnetwork 502 is shown. Multicast data (S1,G1) is sent to the subnetwork 502 at the BFR1 504a. As in FIG. 6, the BFR1 504a multicasts the data to the BFR2 504b. Unlike the scenario in FIG. 6, however, the state of the data is known to be (S1,G1), so it is known that the data arrived at the correct interface. Thus, the BFR2 504b does not perform the RPF check. In this way, the data path of the BFR2 504b is involved with the multicasting, but the control path of the BFR2 504b is not. If the data does reach the control path for any reason, the control path can delete the data. The data is multicast from the slot1 608a to only the slot3 608c. The data is not multicast to the slot2 608b or the slot5 608e because no G1 members reside behind those slots 608b,e. The data is not multicast to the slot4 608d as in FIG. 6 because the state of the data is known and, therefore, the BFR5 504e already received the data from the BFR3 504c, which received the data from the BFR1 504a. (The BFR2 504b knows that the BFR5 504e considers the BFR3 504c and the link N9 506i as the BFR5's parent for G1 and would discard any data sent to it on the link N7 506g by the BFR2 504b.)

A number of embodiments of the invention have been described. Nevertheless, it will be understood that various modifications may be made without departing from the spirit and scope of the invention. Accordingly, other aspects, advantages, and modifications are within the scope of the following claims.

What is claimed is:

1. A method, executed by a router, for processing multicast data that is associated with a multicast group and transmitted to a port of a line card of the router, comprising the sequential steps of:

receiving multicast data for which state information is unknown because there is no specific identification in memory of at least one port associated with a destination of the multicast data;

determining that a data path within the router does not include, in memory, forwarding information for the multicast data which specifically identifies at least one port associated with a destination of the multicast data;

broadcasting the multicast data from each port of the router that could possibly be associated with a destination of the multicast data; and subsequent to broadcasting the multicast data, determining via a control path which ports of the router are actually associated with a destination of the multicast data, and storing a specific indication of those ports in the memory of the data path, whereby the multicast data is forwarded from the router even if the multicast data is dropped in the control path.

2. The method of claim 1 including the further step of transmitting subsequent multicast data associated with the multicast group via only the ports determined to be appropriate for the multicast group.

3. The method of claim 1 wherein the step of broadcasting the multicast data includes transmitting the multicast data via all ports except the port on which the multicast data was received.

4. The method of claim 1 further comprising performing a reverse path forwarding check on the data.

5. The method of claim 4 wherein the performing is done using a multicast border gateway protocol.

6. The method of claim 1 further comprising verifying that the data was received at the proper line card.

7. The method of claim 6 wherein the verifying is done using a multicast border gateway protocol.

8. An article comprising a machine-readable medium which stores machine-executable instructions the instructions causing a machine to process multicast data that is associated with a multicast group and transmitted to a port of a line card of a router to:

receive multicast data for which state information is unknown because there is no specific identification in memory of at least one port associated with a destination of the multicast data;

determine that a data path within the router does not include, in memory, forwarding information for the multicast data which specifically identifies at least one port associated with a destination of the multicast data;

prompt broadcast of the multicast data from each port of the router that could possibly be associated with a destination of the multicast data; and subsequent to prompting broadcast of the multicast data, determine via a control path which ports of the router are actually associated with a destination of the multicast data, and store a specific indication of those ports in the memory of the data path.

9. The article of claim 8 wherein the instructions cause the machine to transmit subsequent multicast data associated with the multicast group from only the ports determined to be appropriate for the multicast group.

10. The article of claim 8 wherein the instructions cause the machine to broadcast the multicast data from all ports except the port on which the multicast data was received.

11. The article of claim 8 further causing a machine to perform a reverse path forwarding check on the data.

12. The article of claim 11 wherein the performing is done using a multicast border gateway protocol.

13. The article of claim 8 further causing a machine to verify that the data was received at the proper line card.

14. The article of claim 13 wherein the verifying is done using a multicast border gateway protocol.

15. A router operative to process multicast data that is associated with a multicast group and transmitted to a port of a line card of the router comprising:

a physical interface including at least one port for communication with at least one other device;

processing logic operable to receive multicast data for which state information is unknown because there is no specific identification in memory of at least one port associated with a destination of the multicast data;

processing logic operable to determine that a data path within the router does not include, in memory, forwarding information for the multicast data which specifically identifies at least one port associated with a destination of the multicast data;

processing logic operable to prompt broadcast of the multicast data from each port of the router that could possibly be associated with a destination of the multicast data; and processing logic operable to determine via a control path, and subsequent to broadcast of the multicast data, which ports of the router are actually associated with a destination of the multicast data, and store a specific indication of those ports in the memory of the data path.

16. The router of claim 15 further comprising a fabric configured to attach to the line card and to a central controller and configured to direct data.

17. The router of claim 15 further comprising a plurality of line cards, each additional line card configured similar to the line card.

18. The router of claim 15 further including processing logic operative to transmit subsequent multicast data associated with the multicast group from only the ports determined to be appropriate for the multicast group.

19. The router of claim 15 further including processing logic operative to broadcast the multicast data from all ports except the port on which the multicast data was received.

20. A method for processing multicast data which is associated with a multicast group and transmitted to a port of a line card of a router comprising:

receiving multicast data for which state information is unknown because there is no specific identification in memory of at least one port associated with a destination of the multicast data;

broadcasting the multicast data from each port of the router that could possibly be associated with a destination of the multicast data;

subsequent to broadcast of the multicast data, performing a reverse path forwarding check on the multicast data;

verifying that the multicast data was received at a proper interfaces;

determining a multicast group associated with the multicast data; and routing subsequent multicast data associated with the multicast group from only the ports associated with the multicast group.

21. The method of claim 20 wherein the multicast data is stored at a data path of a line card.

22. The method of claim 20 further comprising multicasting the multicast data to all available interfaces after storing the multicast data.

23. The method of claim 20 wherein the state information includes a source parameter indicating a source of the multicast data.

24. The method of claim 20 wherein the state information includes a group parameter indicating at least one destination of the multicast data.

25. The method of claim 20 wherein the multicast data is received at a line card.

26. The method of claim 20 wherein a data path associated with a router and configured to process multicast data executes the performing and the verifying.

27. The method of claim 26 wherein the data path uses a multicast border gateway protocol in executing the performing and the verifying.

28. The method of claim 20 wherein a processor included in a router and configured to process multicast data executes the determining.

29. The method of claim 20 further comprising trimming routes to paths not associated with the multicast group.

30. The method of claim 20 further comprising receiving multicast data including known state information.

31. The method of claim 30 further comprising verifying that the multicast data including known state information was received at a proper interface.

32. The method of claim 31 further comprising multicasting the multicast data including known state information according to the known state information if the multicast data including known state information is verified.

33. The method of claim 31 further comprising dropping the multicast data including known state information if the multicast data including known state information is not verified.

34. A method executed by a router for processing multicast data which is associated with a multicast group and transmitted to a port of a line card of a router, comprising the steps of:

determining whether a data path within the router includes forwarding information for the multicast data, in memory, which specifically identifies at least one port associated with a destination of the multicast data;

if the data path does not include the forwarding information for the multicast data, installing a default state associated with multicast data in a data path of a line card;

broadcasting the multicast data from the line card to all other line cards that the line card is configured to communicate with;

sending the multicast data from the data path to a control path of the line card;

subsequent to broadcasting the multicast data, at the control path, computing a route for the multicast data;

sending the computed route from the control path to the data path; and designating that the line cards not included in the computed route not broadcast multicast data having the same state information and subsequently received at the data path.

35. The method of claim 34 further comprising performing at the data path a reverse path forwarding check on the multicast data using a multicast gateway border protocol.

36. The method of claim 34 further comprising prior to the installing, checking state information associated with the multicast data with a multicast border gateway protocol to verify that the line card received the multicast data from a proper source.

* * * * *